United States Patent
Kawamura et al.

(10) Patent No.: US 7,161,298 B2
(45) Date of Patent: Jan. 9, 2007

(54) PLASMA DISPLAY UNIT

(75) Inventors: Hiroyuki Kawamura, Osaka (JP);
Kazuhiko Sugimoto, Kyoto (JP);
Masaki Aoki, Osaka (JP); Mitsuhiro Otani, Osaka (JP); Hiroshi Setoguchi, Osaka (JP); Junichi Hibino, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 417 days.

(21) Appl. No.: 10/489,326

(22) PCT Filed: May 15, 2003

(86) PCT No.: PCT/JP03/06047

§ 371 (c)(1),
(2), (4) Date: Mar. 11, 2004

(87) PCT Pub. No.: WO03/097767

PCT Pub. Date: Nov. 27, 2003

(65) Prior Publication Data
US 2004/0239247 A1 Dec. 2, 2004

(30) Foreign Application Priority Data
May 17, 2002 (JP) .............................. 2002-142659

(51) Int. Cl.
*C01B 25/00* (2006.01)
*C01B 25/01* (2006.01)
*C01B 25/02* (2006.01)
*H01J 1/14* (2006.01)

(52) U.S. Cl. ...................... 313/582; 313/483; 313/484; 313/485; 313/486; 313/487; 252/301.4 R; 252/301.4 P; 252/301.6 R; 252/301.6 P; 427/66

(58) Field of Classification Search ........ 313/483–487; 252/301.4–301; 427/66
See application file for complete search history.

(56) References Cited

U.S. PATENT DOCUMENTS

| | | | | |
|---|---|---|---|---|
| 5,839,718 A * | 11/1998 | Hase et al. | ........... | 252/301.4 F |
| 6,501,520 B1 * | 12/2002 | Nose et al. | ........... | 349/96 |
| 6,717,353 B1 * | 4/2004 | Mueller et al. | ........... | 313/501 |
| 6,777,879 B1 * | 8/2004 | Juestel et al. | ........... | 315/59 |
| 6,802,990 B1 * | 10/2004 | Toda et al. | ........... | 252/301.4 F |

FOREIGN PATENT DOCUMENTS

JP  64-6087  1/1989

OTHER PUBLICATIONS

H. Yamamoto, "Phosphors For Next-Generation Display Devices", Applied Physics, vol. 70, No. 3 (2001), pp. 309-312 with partial translation.
M. Shiiki et al., "Thermal degradation of PDP phosphors", Technical Report of IEICE. EID99-94 (Jan. 2000), pp. 117-122.
H. Yamamoto, "Phosphors For Next-Generation Display Devices", Applied Physics, vol. 70, No. 3 (2001), pp. 309-312 with partial translation.
M. Shiki et al., "Thermal degradation of PDP phosphors", Technical Report of IEICE. EID99-94 (Jan. 2000), pp. 117-122.

* cited by examiner

*Primary Examiner*—Nimeshkumar D. Patel
*Assistant Examiner*—Gabriel Olander
(74) *Attorney, Agent, or Firm*—Wenderoth, Lind & Ponack, L.L.P.

(57) ABSTRACT

A plasma display device includes a blue phosphor composed of a compound represented by $Me_3MgSi_2O_8$:Eu (where, Me is at least calcium (Ca), strontium (Sr), or barium (Ba)). Concentration of bivalent Eu ions is 45 to 95% and concentration of trivalent Eu ions is 5 to 55%, of the europium (Eu) atoms contained in the blue phosphor layer. The plasma display device has less luminance degradation in a panel manufacturing process, high luminance, and long lifetime.

8 Claims, 4 Drawing Sheets

PLASMA DISPLAY UNIT

TECHNICAL FIELD

The present invention relates to a plasma display device that is used for image display on a television or the like and has a phosphor layer excited by ultraviolet rays to emit light, and related to a phosphor thereof.

BACKGROUND ART

Recently, in the field of a color display device used for image display on a computer or a television, a plasma display device including a plasma display panel (PDP) receives attention because it can be enlarged, thinned, and lightened. The plasma display device displays an image in full color by additive mixing of so-called three primary colors (red, green, blue). For performing the full color display, the plasma display device has a phosphor layer for emitting light of each of three primary colors, red (R), green (G), and blue (B), and phosphor particles constituting the phosphor layer are excited by ultraviolet rays generated in a discharge cell of the PDP and hence generate visible light of each color.

A compound is used for a phosphor of each color, the compound for emitting red light is. (YGd)BO$_3$:Eu$^{3+}$ or Y$_2$O$_3$:Eu$^{3+}$, the compound for emitting green light is Zn$_2$SiO$_4$:Mn$^{2+}$, and the compound for emitting blue light is BaMgAl$_{10}$O$_{17}$:Eu$^{2+}$, for example. These phosphors are produced generally by mixing predetermined raw materials and sintering them at a temperature of 1000° C. or higher for solid phase reaction. Phosphor particles obtained by the sintering are further crushed and classified to produce phosphor particles having a predetermined grain size. For example, an average grain size of red and green phosphor particles is 2 μm to 5 μm, and an average grain size of blue phosphor particles is 3 μm to 10 μm. The reason why the phosphor particles are crushed and classified is described below. For forming a phosphor layer on the PDP, generally, a screen-printing method of pasting phosphor particles of each color, or an ink jet method of delivering phosphor ink through a narrow nozzle is used. In these method, as the phosphor has smaller and more uniform grain size, namely as grain size distribution is more uniform, a smoother coated surface is easily formed in pasting. In other words, as the phosphor has smaller and more uniform grain size and has a shape closer to sphere, the coated surface is smoother, filling density of the phosphor particles in the phosphor layer increases, light emitting surface area of the particles increases, and unstability in address driving improves. Luminance of the plasma display device can be therefore increased.

When the grain size of the phosphor particles is decreased, however, the surface area of the particles increases and a defect in the phosphor is apt to increase. Thus, much water, carbon dioxide, or hydrocarbon-based organic matters are apt to adsorb onto a surface of the phosphor. Especially, in the blue phosphor such as Ba$_{1-X}$MgAl$_{10}$O$_{17}$:Eu$_X$, CaMgSi$_2$O6:Eu, or Ca$_3$MgSi$_2$O$_8$:Eu in which bivalent europium (Eu) ions mainly emit light, originally stable trivalent Eu is reduced to bivalent europium, so that an oxygen defect occurs in a crystal during reduction. It is especially shown that increasing the substitution ratio of Eu increases the oxygen defect amount. Water and carbon hydride existing in the air thus, selectively adsorb to an oxygen defect near calcium (Ca), strontium (Sr), barium (Ba), or Eu ion in a phosphor crystal. Therefore, in a panel manufacturing process, much water and carbon hydride are released into a discharge space of the panel and react with the phosphor and magnesium oxide (MgO) functioning as protective film during the discharge. A phenomenon such as luminance degradation, chromaticity change (color shift or screen seizure due to chromaticity change), decrease of driving margin, or increase of discharge voltage is apt to occur.

Since water and hydrocarbon gas selectively adsorb to a blue phosphor, ethylcellulose in a binder hardly adsorbs to the blue phosphor in producing paste or ink, and hence the blue phosphor is apt to separate from the ethylcellulose. When the ethylcellulose and the blue phosphor are separated from each other, the blue phosphor is apt to accumulate near a nozzle opening having zero velocity gradient especially in the inkjet method, and hence the nozzle is disadvantageously clogged.

A method of addressing these problems by coating the entire surface of the phosphor with alumina (Al$_2$O$_3$) film is disclosed, for example, in Japanese Patent Unexamined Publication No. 2001-55567. The coating of the entire surface newly causes absorbing of ultraviolet rays to decrease light emitting luminance of the phosphor, and the coating cannot sufficiently prevent the decrease of luminance due to the ultraviolet rays.

The phosphor used in a PDP or the like is manufactured by a solid-phase reaction method or an aqueous solution reaction method, but decreasing of the grain size is apt to generate a defect. In the solid-phase reaction method, especially, sintering or crushing the phosphor in reducing atmosphere is known to generate many defects. Ultraviolet rays having 147 nm of wavelength generated by discharge in driving the panel is also known to generate a defect in the phosphor (for example, Institute of Electronics, Information and Communication, Technology and research report, EID99-94 Jan. 27, 2000).

Especially, the blue phosphor such as BaMgAl$_{10}$O$_{17}$:Eu or Ca$_3$MgSi$_2$O$_8$:Eu where bivalent Eu ions emit light is known to include an oxygen defect in the phosphor material itself (for example, Applied physics, Vol. 70, No. 3, 2001, PP310).

The generation of these defects is considered to cause luminance degradation of the conventional blue phosphor by itself. In other words, it has been considered that a defect generated by an impact on the phosphor from an ion occurring in driving the panel or a defect generated by the ultraviolet rays having 147 nm of wavelength causes the luminance degradation.

DISCLOSURE OF THE INVENTION

The present invention addresses the problems discussed above, and aims to suppress of adsorption of water and carbon hydride onto a surface of a blue phosphor, reduce luminance degradation and chromaticity change of the phosphor, and improve a discharge characteristic of the phosphor, by eliminating occurrence of oxygen defects existing near Ca, Sr, Ba, or Eu ions in the blue phosphor.

Inventors of the present invention found that luminance degradation is not essentially caused only by existence of a defect. Water, carbon dioxide gas, or hydrocarbon gas selectively adsorbs on the oxygen defects near the Ca, Sr, Ba, or Eu ions, ultraviolet rays or ions are radiated in the adsorbing state, and the. phosphor therefore reacts with water or carbon hydride to cause luminance degradation and color shift. In other words, the water, carbon dioxide gas, or hydrocarbon gas selectively adsorbs on the oxygen defects near the Ca, Sr, Ba, or Eu ions in the blue phosphor composed of $Me_3MgSi_2O_8$:Eu (where, Me is at least one of Ca, Sr, and Ba), thereby causing various degradations.

When the water, carbon dioxide gas, or hydrocarbon gas adsorbs on the oxygen defects, ethylcellulose in a binder hardly adsorbs on the phosphor in producing ink. Therefore, binding of the phosphors via ethylcellulose is eliminated, ink accumulates near a nozzle opening when the ink is applied by the ink jet method, or ethylcelluloses intertwine to cause clogging.

The present invention, based on the findings, aims to prevent degradation of the blue phosphor and clogging of the nozzle in the panel manufacturing process or in the panel driving process without reducing the luminance of the blue phosphor, by reducing the oxygen defects in the blue phosphor. For reducing the oxygen defects near Me, Mg, or Eu ions in a compound $Me_3MgSi_2O_8$:Eu (where, Me is at least one of Ca, Sr, and Ba), bivalent Eu ions substituted for Ca, Sr, or Ba ions are partially substituted by trivalent Eu ions. Thus, the oxygen defects in the blue phosphor are reduced. In other words, Eu ions in the compound $Me_3MgSi_2O_8$:Eu (where, Me is at least one of Ca, Sr, and Ba) used as the blue phosphor come into lattices of Ca, Sr, or Ba for Me and exist as bivalent positive ions. When the bivalent Eu ions are partially substituted by trivalent Eu ions by oxidation or the like of the phosphor, positive charges increase in the crystal. Oxygen having negative charge fills the oxygen defects near the Ca, Sr, Ba, or Eu ions for neutralizing the positive charges, namely for compensating the charges, so that the oxygen defects can be probably decreased.

As the oxygen defects are decreased, occurrence of the degradation can be reduced in each process. When trivalent ions excessively increase, however, the luminance disadvantageously decreases. An especially preferable existing range of trivalent Eu ions is 5 to 55%.

A plasma display device of the present invention thus has a plasma display panel in which a plurality of discharge cells of one color or a plurality of colors are arranged, and a phosphor layer is disposed on each discharge cell and is excited by ultraviolet rays to emit light. The phosphor layer has at least a blue phosphor layer, and each blue phosphor of the blue phosphor layer is composed of $Me_3MgSi_2O_8$:Eu (where, Me is at least one of Ca, Sr, and Ba). Of the europium (Eu) atoms composing the blue phosphor, concentration of bivalent Eu ions is 45 to 95% and concentration of trivalent Eu ions is 5 to 55%.

The phosphor of the present invention is composed of a compound having a crystal structure of $Me_3MgSi_2O_8$:Eu (where, Me is at least one of Ca, Sr, and Ba). The compound is excited by ultraviolet rays to emit light. Of the Eu atoms composing the phosphor, concentration of bivalent Eu ions is 45 to 95% and concentration of trivalent Eu ions is 5 to 55%.

A manufacturing method of a phosphor of the present invention has the following steps: sintering the phosphor of the compound $Me_3MgSi_2O_8$:Eu (where, Me is at least one of Ca, Sr, and Ba) having bivalent Eu ions in the matrix, so as to substitute trivalent Eu ions for 5 to 55% of bivalent Eu ions.

A manufacturing method of a phosphor of the present invention has the following steps:

producing a mixture by mixing oxide, carbonated material, or metallic salt that contains Ca, Ba, Sr, magnesium (Mg), silicon (Si), and Eu;

decomposing one of the carbonated material and metallic salt by sintering the mixture in the air;

sintering the mixture in reducing atmosphere to provide a state where all Eu atoms are bivalent; and sintering the mixture in oxidizing atmosphere to provide a state where concentration of bivalent Eu ions is 45 to 95% and concentration of trivalent Eu ions is 5 to 55%.

In other words, a solid-phase sintering method, a liquid phase method, or a liquid spray method is used as a manufacturing method of a phosphor. The solid-phase sintering method is conventionally used, and in this method, oxide, carbonated material, or nitrated material is sintered using flux in a solid phase state. Here, the flux includes calcium fluoride ($CaF_2$), magnesium fluoride ($MgF_2$), or europium fluoride ($EuF_3$), for example. In the liquid phase method, organic metal salt or nitrate is hydrolyzed in aqueous solution, alkali is added to them to precipitate and produce precursor of the phosphor in a coprecipitation process, and the precursor is heat-treated to produce the phosphor. In the liquid spray method, aqueous solution containing phosphor material is sprayed into a heated furnace to produce the phosphor. In either of these methods, substituting trivalent ions for part of bivalent ions of compound $Me_3MgSi_2O_8$:Eu as the phosphor extremely effectively prevents luminance degradation and clogging during ink jet coating.

The solid-phase reaction method of a blue phosphor is described as an example of the manufacturing methods of the phosphor. A small amount of flux as a sintering accelerator is added to carbonated material or oxide as raw material if necessary, and they are sintered in hydrogen-nitrogen ($H_2$—$N_2$) for two hours at 1000 to 1400° C. The sintering accelerator is $CaF_2$, $EuF_3$, or barium chloride ($BaCl_2$), for example. The carbonated material or oxide is, calcium carbonate ($CaCO_3$), strontium carbonate ($SrCO_3$), barium carbonate ($BaCO_3$), magnesium carbonate ($MgCO_3$), silicon dioxide ($SiO_2$), and europium oxide ($Eu_2O_3$), for example. At this time, all Eu ions are bivalent. After the sintering, the obtained phosphor is crushed and classified. Then, the phosphor is heat-treated at 350 to 1000° C. in oxygen ($O_2$), oxygen-nitrogen ($O_2$—$N_2$), water vapor-nitrogen ($H_2O$—$N_2$), or ozone-nitrogen ($O_3$—$N_2$) to partially substitute trivalent Eu ions for bivalent Eu ions. In the heat treatment in the oxidizing atmosphere after the reduction at 1000 to 1400° C., oxidation may be performed at a lower temperature range of 350 to 1000° C. in the same furnace as that used for the reduction.

In the liquid phase method of manufacturing a phosphor from aqueous solution, organic metal salt or nitrate that contains elements composing the phosphor is dissolved in water, and then hydrolyzed to produce coprecipitation (hydrate) material. Here, the organic metal salt is alkoxide or acetylacetone, for example. The coprecipitation material is hydrothermally synthesized (crystallized in an autoclave), sintered in the air, or sprayed into a high temperature furnace, thereby obtaining powder. The powder is sintered for two hours at 1000 to 1400° C. in reducing atmosphere such as $H_2/N_2$=5/95 (%), crushed, and classified. Next, the resultant powder is sintered at 350 to 1000° C. in $O_2$, $O_2$—$N_2$, $H_2O$—$N_2$, or $O_3$—$N_2$ to produce the phosphor.

The ratio of trivalent Eu ions to bivalent Eu ions is preferably 5 to 55%. When the substitution ratio is 5% or less, the preventing effect of nozzle clogging and luminance degradation is small. When the substitution ratio is 55% or more, the luminance of the phosphor decreases disadvantageously. The partial substitution of the trivalent Eu ions for the bivalent Eu ions can be identified by an X-ray absorption near edge structure (Xanes).

Thus, in the conventional manufacturing method of the blue phosphor powder, the blue phosphor hardly adsorbing water or carbon hydride can be obtained without decreasing the luminance of the blue phosphor, by partially substituting the trivalent Eu ions for the bivalent Eu ions in the compound $Me_3MgSi_2O_8$:Eu (where, Me is at least one of Ca, Sr, and Ba). Coating the phosphor layer in the ink jet method can also prevent clogging of the nozzle. As a result, adsorption of water or carbon dioxide hardly occurs even in the phosphor sintering process, a panel sealing process, a panel aging process, or a panel driving process, and hence a highly reliable plasma display panel can be realized.

In other words, a plasma display device of the present invention has a plasma display panel in which a plurality of discharge cells of one color or a plurality of colors are arranged, and a phosphor layer of a corresponding color is disposed on each discharge cell and is excited by ultraviolet rays to emit light. The phosphor layer has a blue phosphor layer, and the blue phosphor layer is composed of blue phosphor particles. In the blue phosphor particles, trivalent Eu ions are substituted for 5 to 55% of bivalent Eu ions in the compound $Me_3MgSi_2O_8$:Eu (where, Me is at least one of Ca, Sr, and Ba).

The blue phosphor particles discussed above have small grain size of 0.05 to 3 μm and a good grain size distribution. When the blue phosphor particles forming the phosphor layer are spherical, the filling density further improves, and a light emitting area of the phosphor particles substantially contributing to the light emission increases. The plasma display device therefore has the improved luminance, the suppressed luminance degradation or color shift, and a high luminance characteristic.

The average grain size of the phosphor particles is further preferably in a range of 0.1 to 2.0 μm. More preferably, the maximum grain size of the grain size distribution is four or less times the average grain size, and the minimum grain size is one-fourth the average grain size. A region at which ultraviolet rays arrive in each phosphor particle extends from the surface to shallowly several hundreds nm, so that only the surface emits light actually. When the grain sizes of the phosphor particles are 2.0 μm or shorter, the surface area of each particle contributing to the light emission increases to increase the light emitting efficiency of the phosphor layer. When the grain sizes are 3.0 μm or longer, the thickness of the phosphor is required to be 20 μm or longer and a sufficient discharge space cannot be secured. When the grain sizes are 0.1 μm or shorter, a defect is apt to occur and the luminance cannot be improved.

When the thickness of the phosphor layer is set in a range of 8 to 25 times the average grain size, the light emitting efficiency of the phosphor layer can be kept high and a sufficient discharge space can be secured. Thus, the luminance of the plasma display device can be increased. Especially, when the average grain size of the phosphor is 3 μm or shorter, this effect is increased.

As specific phosphor particles used in a blue phosphor layer in the plasma display device, a compound represented by $Me_{3(1-X)}MgSi_2O_8$:$Eu_X$ (where, Me is at least one of Ca, Sr, and Ba) where trivalent Eu ions are substituted for 5 to 55% of bivalent Eu ions can be employed. When X value in the compound is $0.003 \leq X \leq 0.25$, the luminance is high advantageously. When Ca, Sr, and Ba are combined, each element may be independently used or the mixture of them may be used, but a combination of Ca and Sr and a combination of Ca and Ba are especially preferable.

As specific phosphor particles used in a red phosphor layer in the plasma display device, a compound represented by $Y_{2-X}O_3$:$Eu_X$ or $(Y, Gd)_{2-X}BO_3$:$Eu_X$ can be employed. When X value is in the compound of the red phosphor is $0.05 \leq X \leq 0.20$, the luminance is high and the luminance degradation is suppressed advantageously.

As specific phosphor particles used in a green phosphor layer in the plasma display device, a compound represented by $Ba_{1-X}Al_{12}O_{19}$:$Mn_X$ or $Zn_{2-X}SiO_4$:$Mn_X$ can be employed. When X value in the compound of the green phosphor is $0.01 \leq X \leq 0.10$, the luminance is high and the luminance degradation is suppressed advantageously.

A manufacturing method of the PDP of the present invention has the following steps:

a coating step of coating the substrate of a back panel, through a nozzle, with paste containing blue phosphor particles, red phosphor particles, green phosphor particles, and a binder;

a sintering step of burning the binder contained in the paste applied on the panel; and a sealing step of stacking and sealing the back panel in which phosphor particles are arranged on the substrate by the sintering step and a front panel having a display electrode.

Here, in the blue phosphor particles, as discussed above, trivalent Eu ions are substituted for 5 to 55% of bivalent Eu ions in the blue phosphor composed of $Me_3MgSi_2O_8$:Eu (where, Me is at least one of Ca, Sr, and Ba). A plasma display device having high luminance and less luminance degradation can be obtained.

A fluorescent light of the present invention has a phosphor layer that is excited by ultraviolet rays to emit visible light. Since trivalent Eu ions are substituted for 5 to 55% of bivalent Eu ions in the blue phosphor composed of $Me_3MgSi_2O_8$:Eu (where, Me is at least one of Ca, Sr, and Ba), the phosphor particles have a high light emitting characteristic, and the fluorescent light can have high luminance and less luminance degradation.

DETAILED DESCRIPTION OF PREFERRED EMBODIMENTS (Exemplary Embodiment 1)

A plasma display device in accordance with an exemplary embodiment of the present invention will be described with reference to drawings.

Figure 1:
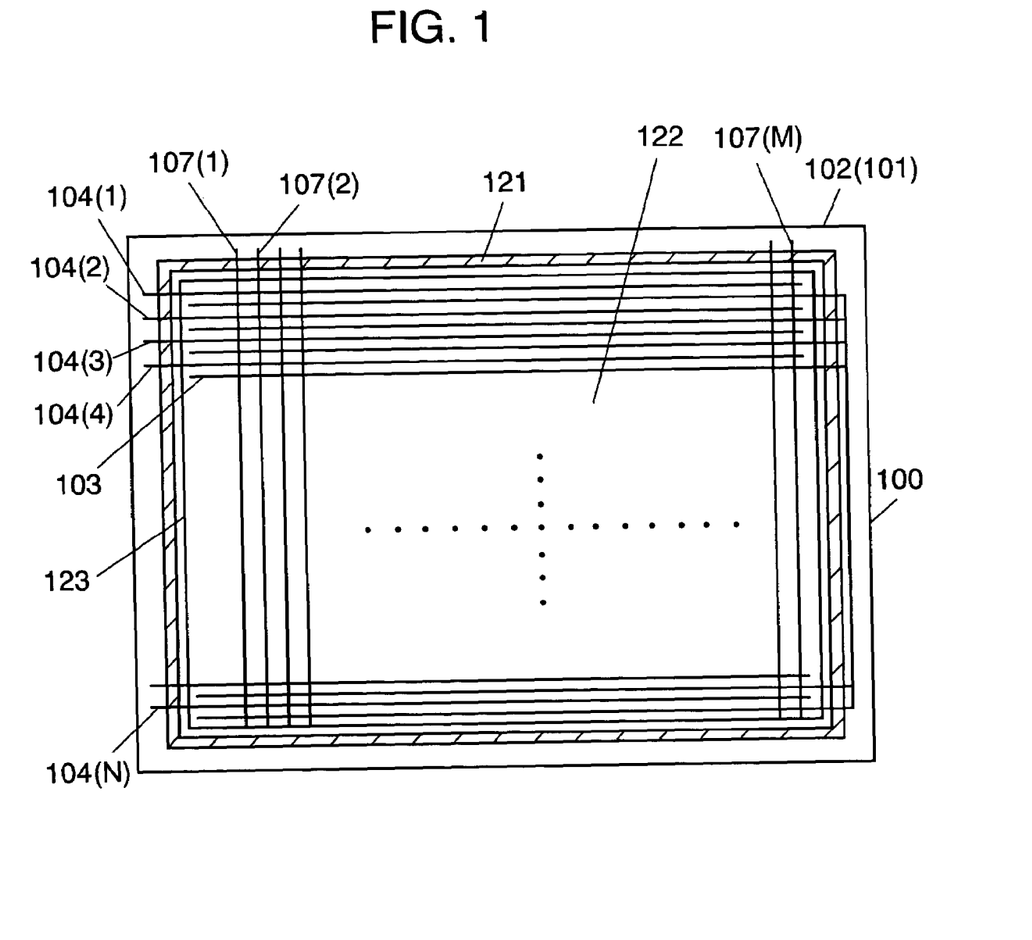
FIG. 1 is a plan view of a plasma display panel, in a removed state of a front glass substrate, in accordance with an exemplary embodiment of the present invention.
Figure 2:
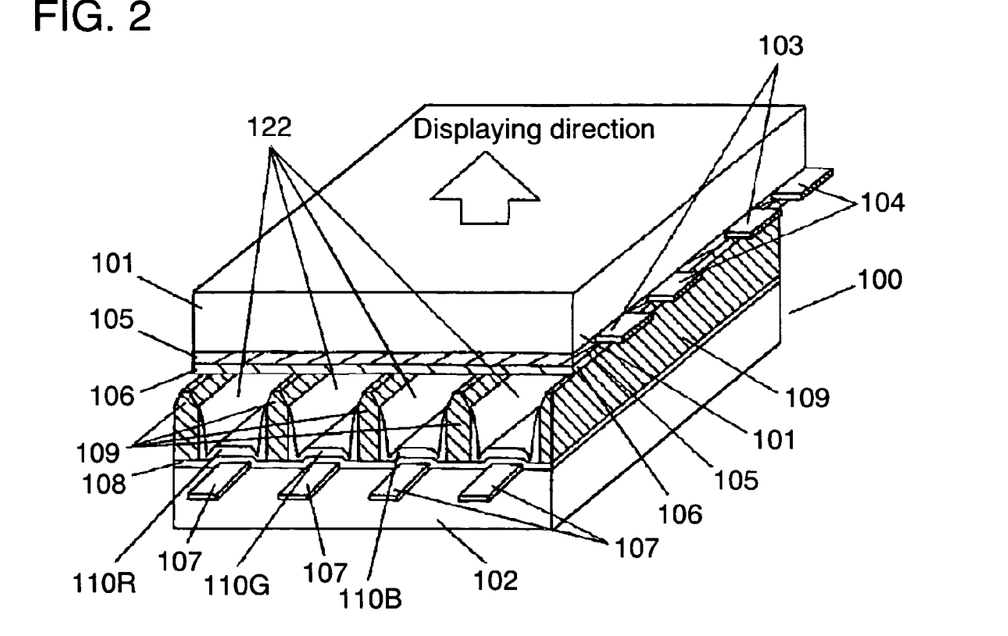
FIG. 2 is a partially sectioned perspective view of an image display region of the plasma display panel.

FIG. 1 is a schematic diagram of the PDP in a removed state of a front glass substrate. FIG. 2 is a partially sectioned perspective view of an image display region of the PDP. In FIG. 1, the respective numbers of display electrodes, display scan electrodes, and address electrodes are reduced for the sake of clarity.

In FIG 1, PDP 100 includes front glass substrate 101, back glass substrate 102, N display electrodes 103, N display scan electrodes 104 (104 (1) to 104 (N)), M address electrodes 107 (107 (1) to 107 (M)), and airtight seal layer 121. The inner region of airtight seal layer 121 is image display region 123. The PDP of the exemplary embodiment has an electrode matrix having three-electrode structure formed of display electrodes 103, display scan electrodes 104, and address electrodes 107. Discharge cells are disposed at intersection points between display electrodes 103 and address electrodes 107, and between display scan electrodes 104 and address electrodes 107.

In PDP 100, as shown in FIG. 2, a front panel and a back panel are adhered to each other, and discharge gas is filled into discharge space 122 formed between the front panel and the back panel. The front panel is formed by disposing display electrodes 103, display scan electrodes 104, dielectric glass layer 105, and MgO protective layer 106 on one main surface of front glass substrate 101. The back panel is formed by disposing address electrodes 107, back-side dielectric glass layer 108, barrier ribs 109, red phosphor layer 110R, green phosphor layer 110G, and blue phosphor layer 110B on one main surface of back glass substrate 102.

Figure 3:
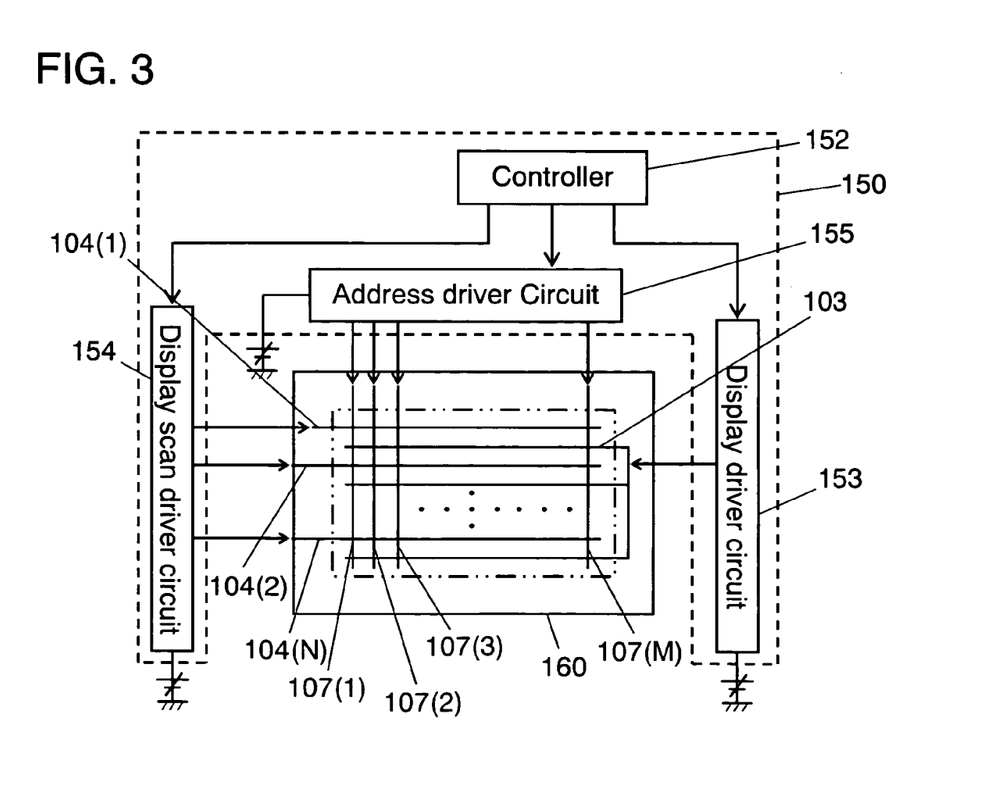
FIG. 3 is a block diagram of a plasma display device using the plasma display panel.

The plasma display device is constituted by connecting the PDP to PDP driving device 150 shown in FIG. 3. The plasma display device, as shown in FIG. 3, has PDP 100, display driver circuit 153, display scan driver circuit 154, address driver circuit 155, and controller 152. When a discharge cell is intended to light up in response to control by controller 152, voltage is applied between display scan electrodes 104 and address electrodes 107 for address discharge, and then pulse voltage is applied between display electrodes 103 and display scan electrodes 104 for sustain discharge. This sustain discharge generates ultraviolet rays in the discharge cell, and the phosphor layer excited by the ultraviolet rays emits light to turn on the discharge cell. Combining the turning on and off of the discharge cells of respective colors forms an image.

Figure 4:
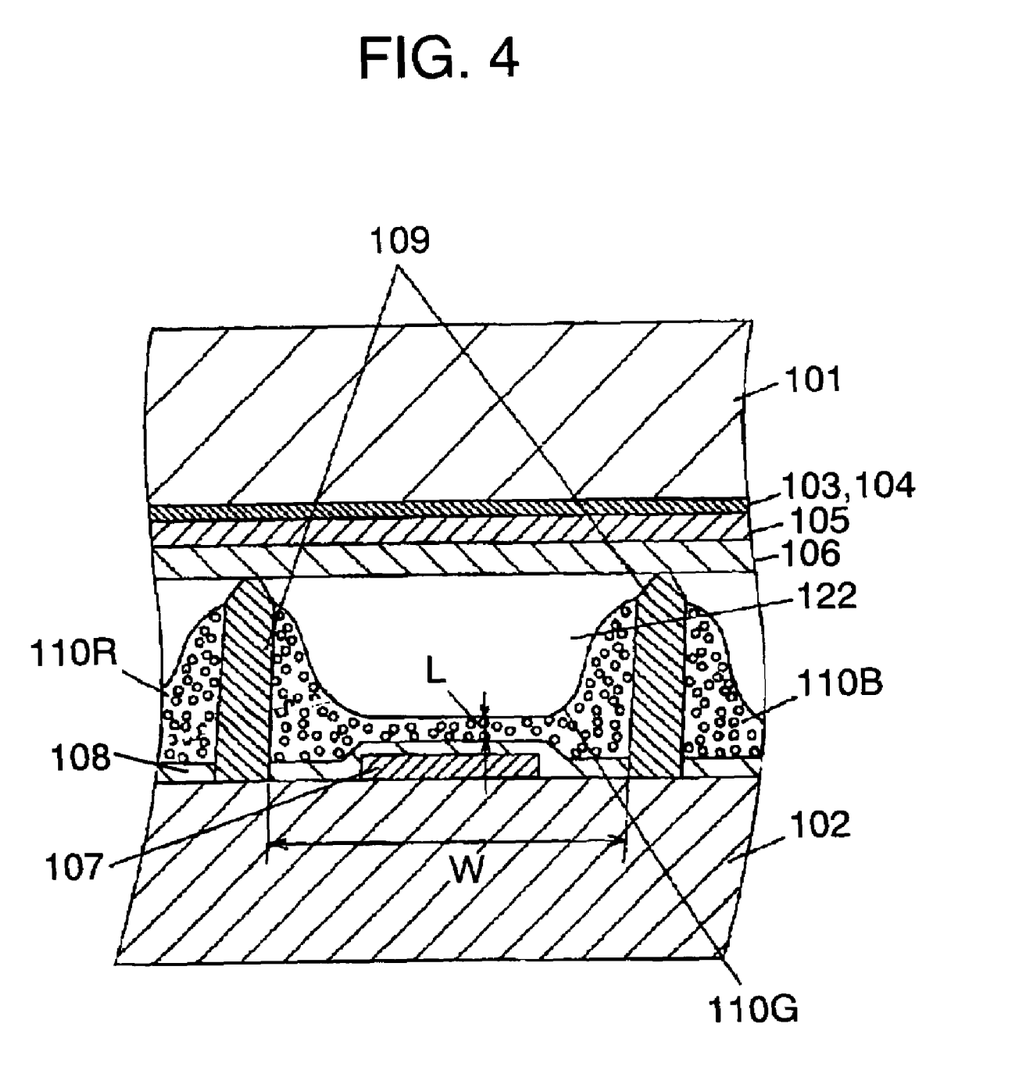
FIG. 4 is a sectional view of the image display region of the plasma display panel.
Figure 5:
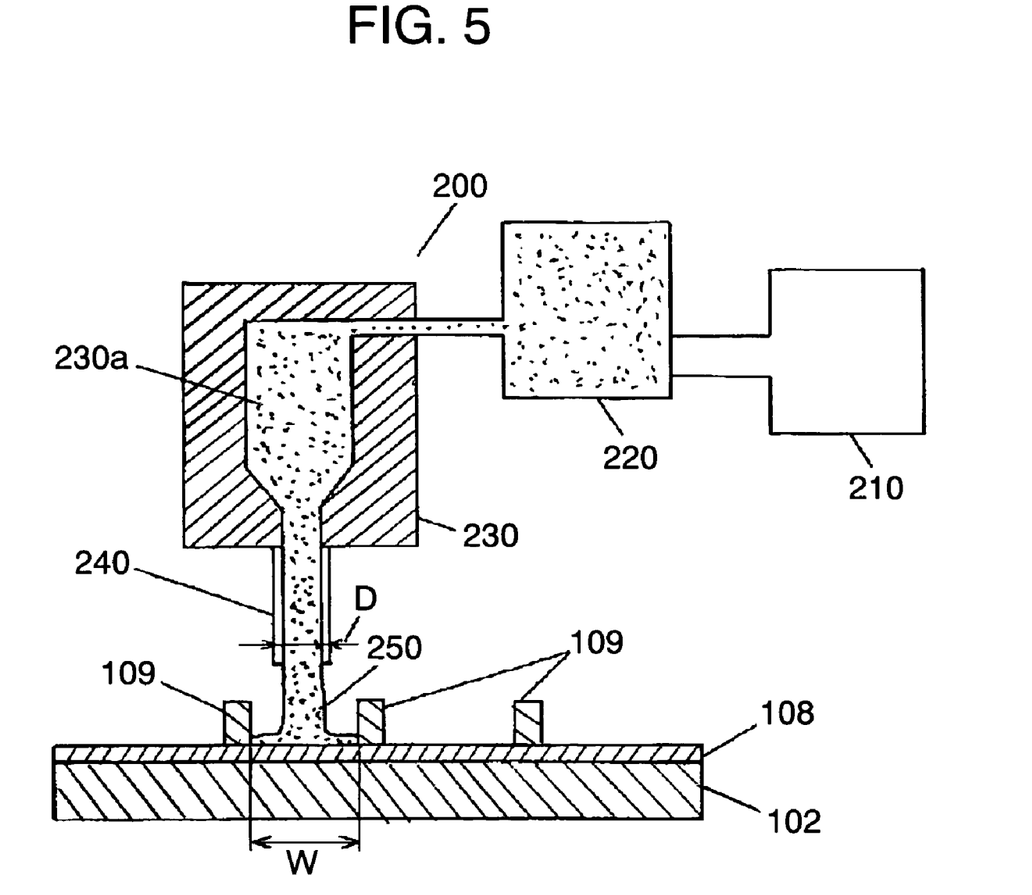
FIG. 5 is a schematic block diagram of an ink applying device used in producing a phosphor layer of the plasma display panel.

A manufacturing method of the PDP will be described with reference to FIG. 4 and FIG. 5. FIG. 4 is a fragmentary sectional view of the PDP of the present embodiment. FIG. 5 is a schematic block diagram of an ink applying device used in producing a phosphor layer.

The front panel is produced by the following steps:
forming N display electrodes 103 and N display scan electrodes 104 (N is assumed to be two in FIG. 2) alternately and in parallel in a stripe shape on front glass substrate 101;
covering them with dielectric glass layer 105; and
forming MgO protective layer 106 on the surface of dielectric glass layer 105.

Each of display electrodes 103 and display scan electrodes 104 is formed of a transparent electrode made of indium tin oxide (ITO) and a bus electrode made of silver. Silver paste for the bus electrode is applied by screen printing and sintered.

Dielectric glass layer 105 is formed to have a predetermined thickness (about 20 μm) by applying paste containing lead-based glass material by screen printing and by sintering it for a predetermined period at a predetermined temperature (for example, for 20 minutes at 560° C.). As the paste containing the lead-based glass material, a mixture produced by mixing, for example, 70 wt % of lead oxide (PbO), 15 wt % of boron oxide ($B_2O_3$), 10 wt % of $SiO_2$, and 5 wt % of $Al_2O_3$ into an organic binder (10% of ethylcellulose is dissolved in α-terpineol) is employed. Here, the organic binder is produced by dissolving resin into organic solvent. Acrylic resin as well as ethylcellulose may be used as the resin, and butyl-carbitol may be used as the organic solvent. A dispersant (for example, glycertrioleate) may be further mixed into the organic binder.

MgO protective layer 106 is formed to have a predetermined thickness (about 0.5 μm) by a sputtering method or a CVD method (Chemical Vapor Deposition method), for example.

The back panel is formed in a state where M address electrodes 107 are arranged in parallel, by applying silver paste for electrode onto back glass substrate 102 in a screen printing method or in a photography method and then by sintering them. Paste containing a lead-based glass material is applied onto address electrodes 107 by the screen printing method to form dielectric glass layer 108. Paste containing the lead-based glass material is also applied repeatedly with a predetermined pitch by the screen printing method, and then sintered to form barrier ribs 109. Barrier ribs 109 partition discharge space 122 into discharge cells in the line direction. Here, each of the discharge cells is a unit light emitting region.

Interval W between barrier ribs 109 is defined dependently on display size of the screen as shown in FIG. 4. Interval W is defined about 130 to 240 μm in a high definition television (HD-TV) of 32 to 50 inches, for example. Phosphor inks of red (R), green (G), and blue (B) are applied to a groove between barrier ribs 109, and they are sintered at 400 to 590° C., thereby forming phosphor layers 110R, 110G, and 110B of respective phosphor particles. As the blue phosphor of the present embodiment, paste-like phosphor ink composed of phosphor particles and an organic binder is employed. The phosphor particles contain the compound in which trivalent Eu ions are substituted for 5 to 55% of bivalent Eu ions in $Me_3MgSi_2O_8$:Eu.

Each thickness L of red phosphor layer 110R, green phosphor layer 110G, and blue phosphor layer 110B in the stacking direction on address electrode 107 is preferably set at about 8 to 25 times an average grain size of the phosphor particles of each color. For keeping luminance (light emitting efficiency) provided when certain ultraviolet rays are radiated to the phosphor layers, the phosphor layers preferably have thickness equivalent to at least 8 layers, further preferably 20 layers, of the phosphor particles to absorb ultraviolet rays generated in the discharge space. When the phosphor layers have the thickness or longer, the light emitting efficiency of the phosphor layers is almost saturated and sufficient size of discharge space 122 cannot be secured. When grain size is sufficiently small and spherical similarly to the phosphor particles formed by a hydrothermal synthesis method or the like, the filling factor of the phosphor is higher than that in the case of using non-spherical particles even when the number of laminations is the same, and total surface area of the phosphor particles increases. The surface area of the phosphor particles contributing to actual light emission increases in the phosphor layer, and the light emitting efficiency increases. A synthesizing method of phosphor layers 110R, 110G, and 110B, and especially a manufacturing method of blue phosphor particles used for blue phosphor layer 110B in which trivalent Eu ions are substituted for 5 to 55% of bivalent Eu ions are described later.

The front panel and the back panel formed discussed above are stacked so that each electrode of the front panel orthogonally cross the address electrodes of the back panel. The front and back panels are sealed by disposing glass for sealing at peripheral edges of the panels and by sintering the glass for 10 to 20 minutes at about 450° C. to form airtight seal layer 121 (FIG. 1). Gas inside discharge space 122 is exhausted to provide high vacuum (for example, $1.1 \times 10^{-4}$ Pa), and then discharge gas (for example, He—Xe based or Ne—Xe based inert gas) is filled at a predetermined pressure, thereby manufacturing PDP 100.

FIG. 5 is a schematic block diagram of an ink applying device used in producing a phosphor layer. In FIG. 5, ink applying device 200 has server 210, pressurizing pump 220, and header 230. Phosphor ink is supplied from server 210 for storing the phosphor ink, pressurized by pressurizing pump 220, and supplied to header 230. Header 230 has inkpot 230*a* and nozzle 240. The phosphor ink pressurized and supplied to inkpot 230*a* is continuously delivered through nozzle 240. Diameter D of nozzle 240 is preferably set at 30 μm or longer for preventing clogging of the nozzle, and not longer than interval W (about 130 to 200 μm) between barrier ribs 109 for preventing extrusion from the barrier ribs in the coating. Diameter D is thus normally set at 30 to 130 μm.

Header 230 is linearly driven by a header scan mechanism (not shown). Header 230 is made to scan, and phosphor ink 250 is continuously delivered from nozzle 240, thereby uniformly applying the phosphor ink to the groove between barrier ribs 109 on back glass substrate 102. Viscosity of the used phosphor ink is kept in a range of 1.5 to 30 Pa·s at 25° C.

A stirring device (not shown) is disposed in server 210, and prevents precipitation of particles in the phosphor ink. Header 230 is unitarily molded together with inkpot 230*a* and nozzle 240, and is manufactured by machining and electric-discharge-machining a metal material.

A forming method of the phosphor layer is not limited to the method discussed above, but various methods such as a photo lithography method, a screen printing method, or a disposing method of a film containing phosphor particles may be employed.

The phosphor is provided by blending phosphor particles of each color, a binder, and a solvent together so as to set the viscosity at 1.5 to 30 Pa·s. A surface-active agent, silica, or a dispersant (0.1 to 5 wt %) may be added to the phosphor ink if necessary.

As a red phosphor blended into the phosphor ink, a compound represented by $(Y, Gd)_{2-X} BO_3:Eu_X$ or $Y_{2-X}O_3:Eu_X$ is employed. In the compound, Eu elements are substituted partially for Y elements composing the matrix. Substitution ratio X of the Eu elements for the Y elements is preferably in a range $0.05 \leq X \leq 0.20$. When the substitution ratio exceeds the range, the luminance increases but the luminance degradation becomes noticeable, and hence actual use of the compound is difficult. When the substitution ratio is below the range, the composition ratio of Eu mainly emitting light decreases, the luminance decreases, and hence the compound cannot be used as the phosphor.

As a green phosphor, a compound represented by $Ba_{1-X}Al_{12}O_{19}:Mn_X$ or $Zn_{2-X}SiO_4:Mn_X$ is employed. In the $Ba_{1-X}Al_{12}O_{19}:Mn_X$, Mn elements are substituted partially for Ba elements composing the matrix. In the $Zn_{2-X}SiO_4:Mn_X$, Mn elements are substituted partially for Zn elements composing the matrix. Substitution ratio X of the Mn elements for the Ba elements and the Zn elements is preferably in a range $0.01 \leq X \leq 0.10$, for the same reason as that described for the red phosphor.

As a blue phosphor, a compound represented by $Me_3MgSi_2O_8:Eu$ is employed. In the $Me_{3(1-X)}MgSi_2O_8:Eu_X$, bivalent Eu elements are substituted partially for bivalent Me elements (where, Me is at least one of Ca, Sr, and Ba) composing the matrix. Substitution ratio X of the Eu elements for the Me elements is preferably in a range $0.003 \leq X \leq 0.25$, for the same reason as that discussed above. A substitution ratio of trivalent Eu elements for the bivalent Eu elements is preferably in a range $0.05 \leq a \leq 0.55$, when the compound is represented by $Me_3Eu^{(+2)}_{1-a}Eu^{(+3)}_a MgSi_2O_8:Eu$. In other words, the range of 5 to 55% is especially preferable for preventing clogging of the nozzle.

A synthesizing method of the phosphors is described later.

Ethylcellulose or acrylate resin is used as the binder blended into the phosphor ink, and α-terpeneol or butylcarbitol is used as the solvent. Here, a blending ratio of the Ethylcellulose or acrylate resin to the phosphor ink is 0.1 to 10 wt %. Polymer such as PMA or PVA may be used as the binder, and an organic solvent such as diethylene glycol or methyl ether may be used as the solvent.

Phosphor particles used in the present embodiment are manufactured by the solid-phase sintering method, the aqueous solution method, the spray sintering method, or the hydrothermal synthesis method. Manufacturing methods of each phosphor are described hereinafter.

Firstly, a manufacturing method of compound $Me_{3(1-X)}MgSi_2O_8:Eu_X$ of a blue phosphor using the hydrothermal synthesis method is described. In the present embodiment, Me is assumed to be Ca.

In mixture producing process, calcium nitrate ($Ca(NO_3)_2$), magnesium nitrate ($Mg(NO_3)_2$), $SiO_2$, and europium nitrate ($Eu(NO_3)_3$) as raw materials are mixed so that the molar ratio is $3(1-X):1:2:X$ (where, $0.003 \leq X \leq 0.25$), and they are dissolved into an aqueous medium to produce hydrated mixture. Ion-exchanged water or pure water is preferably used as the aqueous medium, because they do not have impurity. However, ion-exchanged water or pure water containing non-aqueous solvent such as methanol or ethanol can be also used.

The hydrated mixture is then poured into a vessel made of gold or platinum having corrosion resistance and heat resistance, and is hydrothermally synthesized in a high pressure vessel, for 12 to 20 hours, at a predetermined temperature (100 to 300° C.), and at a predetermined pressure (0.2 to 10 Mpa), using an apparatus such as an autoclave capable of simultaneously performing pressurizing and heating.

Powder produced by the hydrothermal synthesis is sintered for a predetermined period at a predetermined temperature, for example for 2 hours at 1350° C., in reducing atmosphere such as atmosphere including 5% of hydrogen and 95% of nitrogen. Most of Eu ions of the blue phosphor produced in the reducing atmosphere are bivalent ions. The phosphor is then classified and heat-treated at 350 to 1000° C. in $O_2$, $O_2$—$N_2$, $H_2O$—$N_2$, or $O_3$—$N_2$ atmosphere, thereby providing blue phosphor $Me_{3(1-X)}MgSi_2O_8:Eu_X$. In this provided blue phosphor, trivalent Eu ions are substituted for 5 to 55% of bivalent Eu ions in the blue phosphor produced in the reducing atmosphere. Adjusting $O_2$ concentration, heat treatment period, and heat treatment temperature controls the substitution ratio of trivalent ions for bivalent ions.

When oxide such as $Al_2O_3$, $SiO_2$, or lanthanum oxide ($La_2O_3$) and fluoride such as lanthanum fluoride ($LaF_3$) or aluminum fuoride ($AlF_3$) are coated onto the surface of the phosphor by hydrolysis of an organic compound containing these elements during the heat treatment in the $O_2$, $O_2$—$N_2$, $H_2O$—$N_2$, or $O_3$—$N_2$ atmosphere, the degradation characteristic of the blue phosphor and the clogging of the nozzle are further improved. At this time, the organic compound such as alkoxide or acetylacetone containing these elements is used. In other words, phosphor powder, alcohol, and the organic compound are mixed, the organic compound is hydrolyzed on the surface of the phosphor, then the alcohol is removed, and heat treatment is performed, thereby coating the surface of the phosphor with the film. The coating thickness with the oxide and the fuoride is preferably minimized to allow transmission of ultraviolet rays. Namely, 0.1 µm or shorter, especially 0.01 µm or shorter, is preferable.

The phosphor particles produced by hydrothermal synthesis are spherical and have grain size smaller than those produced by the conventional solid phase reaction. The average grain size is about 0.05 to 2.0 µm. The term "spherical" is now defined that the axis ratios (minor axis/major axis) of most of phosphor particles are 0.9 to 1.0, for example. However, all phosphor particles do not necessarily lie in this range.

Blue phosphor powder may be synthesized by spraying the hydrated mixture into a high temperature furnace from the nozzle by the spray method without pouring the hydrated mixture into the vessel made of gold or platinum, and then may be heat-treated in the $O_2$, $O_2$—$N_2$, $H_2O$—$N_2$, or $O_3$—$N_2$ atmosphere.

Next, Me is assumed to be a compound of Ca, Ba, and Sr, and a manufacturing method of a blue phosphor $(Ca, Ba, Sr)_{3(1-X)}MgSi_2O_8:Eu_X$ is described. This blue phosphor is produced by the solid phase reaction from raw material different from the material discussed above. The raw material used here is described.

Calcium hydroxide $(Ca(OH)_2)$, barium hydroxide $(Ba(OH)_2)$, strontium hydroxide $(Sr(OH)_2)$, magnesium hydroxide $(Mg(OH)_2)$, aluminum hydroxide $(Al(OH)_3)$, and europium hydroxide $(Eu(OH)_2)$ are used as the raw materials. These materials are weighted at a predetermined molar ratio, are mixed with $AlF_3$ as flux, are sintered at 1100° C. in the air, and are then sintered at a predetermined temperature (1100 to 1600° C.) for 2 hours in the reducing atmosphere (such as atmosphere including 5% of hydrogen and 95% of nitrogen). Then, during decrease of the temperature from the range of 1100 to 1600° C., $O_2$, $O_2$—$N_2$, $H_2O$—$N_2$, or $O_3$—$N_2$ is injected into the sintering furnace at a temperature between 350 and 1000° C., thereby providing a blue phosphor where trivalent Eu ions are substituted for partial ions of bivalent Eu ions.

Oxide, nitrate, and hydroxide are mainly used as raw materials of the phosphor here. However, an organic metal compound containing an element such as Ca, Ba, Sr, Mg, Al, or Eu, for example metal alkoxide or acetylacetone, may be used. The degradation characteristic of the phosphor is further improved, when $Al_2O_3$, $SiO_2$, $AlF_3$, $La_2O_3$, or $LaF_3$ is coated by hydrolysis using the metal alkoxide or acetylacetone during the sintering in $O_2$, $O_2$—$N_2$, $H_2O$—$N_2$, or $O_3$—$N_2$.

Next, a manufacturing method of the compound $Zn_{2-X}SiO_4:Mn_X$ of a green phosphor is described hereinafter.

In a mixture producing process, zinc nitrate $(Zn(NO_3)_2)$, silicon nitrate $(Si(NO_3)_2)$, and manganese nitrate $(Mn(NO_3)_2)$ as raw materials are mixed at the molar ratio $(2-X):1:X$, where $0.01 \leq X \leq 0.10$. The mixture is heated to 1500° C. and is sprayed from the nozzle by applying the ultrasonic vibration. The green phosphor is thus produced.

A manufacturing method of the compound $Ba_{1-X}Al_{12}O_{19}:Mn_X$ is similarly described.

In a mixture producing process, barium nitrate $(Ba(NO_3)_2)$, aluminum nitrate $(Al(NO_3)_3)$, and manganese nitrate $(Mn(NO_3)_2)$ as raw materials are mixed at the molar ratio $(1-X):12:X$, where $0.01 \leq X \leq 0.10$. They are then dissolved into ion-exchanged water to produce a mixture.

In a hydration process, basic aqueous solution such as ammonia aqueous solution is dropped into the mixture, thereby producing hydrate. In a hydrothermal synthesis process, the hydrate and ion-exchanged water are poured into a capsule made of platinum or gold having corrosion resistance and heat resistance. Then, they are hydrothermally synthesized in a high pressure vessel such as an autoclave for a predetermined period (e.g. 2 to 20 hours), at a predetermined temperature (e.g. 100 to 300° C.), and at a predetermined pressure (e.g. 0.2 to 10 Mpa).

The matter produced by the hydrothermal synthesis is dried to provide the $Ba_{1-X}Al_{12}O_{19}:Mn_X$. This phosphor provided by the hydrothermal synthesis process is spherical and has grain size of about 0.1 to 2.0 µm. This powder is heat-treated in the air at 800 to 1100° C. and classified, thereby producing a green phosphor.

Next, a manufacturing method of the compound $(Y,Gd)_{2-X}BO_3:Eu_X$ of a red phosphor is described hereinafter.

In a mixture producing process, yttrium nitrate $(Y(NO_3)_3)$, gadolinium nitrate $(Gd(NO_3)_3)$, boric acid $(H_3BO_3)$, and europium nitrate $(Eu(NO_3)_3)$ as raw materials are mixed so that the molar ratio $(2-X):2:X$ and the ratio of Y to Gd is 65:35, where $0.05 \leq X \leq 0.20$. The mixture is then heat-treated for 2 hours at 1200 to 1350° C. in the air and is classified, thereby producing a red phosphor.

A manufacturing method of the compound $Y_{2-X}O_3:Eu_X$ of a red phosphor is described.

In a mixture producing process, yttrium nitrate $(Y(NO_3)_3)$ and europium nitrate $(Eu(NO_3)_3)$ as raw materials are mixed so that the molar ratio is $(2-X):X$, where $0.05 \leq X \leq 0.30$. They are then dissolved into ion-exchanged water to produce a mixture. In a hydration process, basic aqueous solution such as ammonia aqueous solution is added to the mixture, thereby producing hydrate.

In a hydrothermal synthesis process, the hydrate and ion-exchanged water are poured into a vessel made of platinum or gold having corrosion resistance and heat resistance. Then, they are hydrothermally synthesized in a high pressure vessel such as an autoclave for a predetermined period (e.g. 3 to 12 hours), at temperature 100 to 300° C. and at pressure 0.2 to 10 Mpa. The matter produced by the hydrothermal synthesis is dried to provide desired $Y_{2-X}O_3:Eu_X$. This phosphor is then heat-treated for 2 hours at 1300 to 1400° C. in the air and is classified, thereby producing a red phosphor. This phosphor provided by the hydrothermal synthesis process is spherical and has grain size of about 0.1 to 2.0 µm. These grain size and the shape are appropriate to form a phosphor layer having a high light emitting characteristic.

In PDP 100 discussed above, the conventional phosphors are used for red phosphor layer 110R and green phosphor layer 110G, and the phosphor particles where trivalent Eu ions are partially substituted for bivalent Eu ions are used for blue phosphor layer 110B.

A conventional blue phosphor extremely degrades in each process, so that color temperature of white provided when lights of three colors are simultaneously emitted is apt to decrease. Therefore, luminances of discharge cells of the phosphors (red and green) other than the blue phosphor are reduced in circuitry in the plasma display device, thereby improving the color temperature of white. When a blue phosphor produced by the manufacturing method of the present invention is used, however, the luminance of the discharge cell of blue is increased, the degradation in the panel manufacturing process is reduced, and hence the luminances of the discharge cells of the other colors are not required to be intentionally reduced. Thus, the luminances of the discharge cells of all colors can be sufficiently increased, so that the color temperature of white is kept high and the luminance of the plasma display device can be increased.

The blue phosphor of the present invention can be employed in a fluorescent light that is excited by the ultraviolet rays to emit light. In this case, conventional blue phosphor particles applied to the inner wall of a fluorescent tube are replaced with a phosphor layer where trivalent Eu ions are substituted for bivalent Eu ions. The fluorescent light having the blue phosphor of the present invention can have higher luminance and less luminance degradation than those of the conventional fluorescent light.

Samples are manufactured for evaluating performance of the plasma display device of the present invention, and specific results of experiments for the evaluation are described.

Each manufactured plasma display device has 42 inches of image display region 123, 150 μm of rib pitch, and the HD-TV specification. In PDP 100 of the plasma display device, the thickness of dielectric glass layer 105 is 20 μm, the thickness of MgO protective layer 106 is 0.5 μm, the interval between display electrodes 103 and display scan electrodes 104 is 0.08 μm. Discharge gas composed of neon as a main component and 5% of xenon is filled into the discharge space at a predetermined pressure.

Eleven plasma display devices are manufactured as samples. Blue phosphor layers 110B of the plasma display devices are produced in response to change of the synthesizing condition and the substitution ratio of trivalent Eu ions for the bivalent Eu ions in compound $Me_{3(1-x)}MgSi_2O_8:Eu_x$ of the blue phosphor. Table 1 shows these manufacturing conditions. Respective phosphors forming red phosphor layer 110R and green phosphor layer 110G are produced in various conditions in the present experiments.

TABLE 1

| Sample No. | Amount of Eu (x) | Manufacturing method | Method of substituting trivalent Eu for bivalent Eu | Substitution ratio of trivalent Eu for bivalent Eu | Ratio of Ca/Sr/Ba | Amount of Eu (x) | Manufacturing method | Amount of Mn (x) | Manufacturing method |
|---|---|---|---|---|---|---|---|---|---|
| | | | Blue Phosphor $Me_{3(1-x)}MgSi_2O_8:Eu_x$ | | | Red Phosphor $(Y,Gd)_{2-x}BO_3:Eu_x$ | | Green Phosphor $(Zn_{1-x}Mn_x)_2SiO_4$ | |
| 1 | x = 0.003 | Hydro-Thermal synthesis | Oxidation in $O_2$ at 520° C. for 10 min | 5.00% | Ca = 1.0 | x = 0.1 | Solid phase reaction | x = 0.01 | Spray method |
| 2 | x = 0.05 | Solid phase reaction (Flux) | Oxidation in $H_2O$—$O_2$ at 610° C. for 60 min | 20.00% | Ca/Ba (1/0.1) | x = 0.2 | Spray method | x = 0.02 | Hydro-Thermal synthesis |
| 3 | x = 0.1 | Spray method | Oxidation in $N_2$—$O_3$(3%) at 700° C. for 60 min | 25.00% | Ca/Sr (0.1/1) | x = 0.3 | Aqueous solution method | x = 0.05 | Solid phase reaction |
| 4 | x = 0.25 | Aqueous solution method | Oxidation in $N_2$—$O_3$(30%) at 900° C. for 60 min | 55.00% | Ba/Ca (1/0.5) | x = 0.15 | Hydro-Thermal synthesis | x = 0.1 | Solid phase reaction |
| | | | Blue Phosphor $Me_{3(1-x)}MgSi_2O_8:Eu_x$ | | | Red Phosphor $Y_{2-x}O_3:Eu_x$ | | Green Phosphor $Ba_{1-x}Al_{12}O_{19}:Mn_x$ | |
| 5 | X = 0.03 | Solid phase reaction (Flux) | Injection and oxidation of $N_2$—$O_2$(20%) at 600° C. or lower during temperature decrease | 5.00% | Ca/Ba (1/0.1) | x = 0.01 | Hydro-Thermal synthesis | x = 0.01 | Hydro-Thermal synthesis |
| 6 | X = 0.1 | Hydro-Thermal synthesis | Injection and oxidation of $N_2$—$O_2$(20%) at 700° C. or lower during temperature decrease | 10.00% | Ca/Sr/Ba (1/1/1) | x = 0.1 | Spray method | x = 0.02 | Spray method |
| 7 | X = 0.1 | Spray method | Injection and oxidation of $N_2$—$O_2$(1%) at 750° C. or lower during temperature decrease | 23.50% | Sr = 1.0 | x = 0.15 | Aqueous solution method | x = 0.05 | Solid phase reaction |
| 8 | X = 0.2 | Solid phase reaction | Oxidation in $H_2O$(0.5%)—$N_2$ at 800° C. for 60 min | 30.60% | Ca = 1.0 | x = 0.2 | Solid phase reaction | x = 0.1 | Solid phase reaction |
| 9 | X = 0.2 | Solid phase reaction | Oxidation in $N_2$—$O_2$(5%) at 900° C. for 60 min | 50.10% | Sr/Ca (1/0.5) | x = 0.2 | Solid phase reaction | x = 0.1 | Solid phase reaction |
| 10* | X = 0.1 | Solid phase reaction | Oxidation in $N_2$—$O_2$(20%) at 1000° C. for 60 min | 60.00% | Sr/Ca (1/0.5) | x = 0.15 | Aqueous solution method | x = 0.01 | Hydro-Thermal synthesis |

TABLE 1-continued

| Sample No. | Amount of Eu (x) | Manufacturing method | Method of substituting trivalent Eu for bivalent Eu | Substitution ratio of trivalent Eu for bivalent Eu | Ratio of Ca/Sr/Ba | Amount of Eu (x) | Manufacturing method | Amount of Mn (x) | Manufacturing method |
|---|---|---|---|---|---|---|---|---|---|
| 11* | X = 0.1 | Solid phase reaction | None | None | Sr/Ca (1/0.5) | x = 0.15 | Aqueous solution method | x = 0.01 | Hydro-Thermal synthesis |

*Samples No. 10 and No. 11 are comparative examples.

In the samples No. 1 to No. 4, $(Y, Gd)_{1-x}BO_3:Eu_X$ is used for the red phosphor, $Zn_{2-x}SiO_4:Mn_X$ is used for the green phosphor, and $Me_{3(1-X)}MgSi_2O_8:Eu_X$ (where, Me is at least one of Ca, Sr, and Ba) of the present invention is used for the blue phosphor. The synthesizing method of the phosphors, the substitution ratios of Eu ions and Mn as an luminescent center, and the substitution ratio of trivalent Eu ions for bivalent Eu ions are varied as shown in Table 1. Here, the substitution ratios of Eu and Mn are the substitution ratio of Eu elements for Y or Me elements (where, Me is at least one of Ca, Sr, and Ba) and the substitution ratio of Mn elements for Zn elements. In the blue phosphors in the samples No. 1 to No. 4, the surfaces of the phosphor particles are coated with oxide or fluoride by the hydrolysis method using metal alkoxide or acetylacetone containing applied elements.

In samples No. 5 to No. 10, $Y_{2-x}O_3:Eu_X$ is used for the red phosphor, $Ba_{1-x}Al_{12}O_{19}:Mn_X$ is used for the green phosphor, and $Me_{3(1-X)}MgSi_2O_8:Eu_X$ (where, Me is at least one of Ca, Sr, and Ba) is used for the blue phosphor. The synthesizing method of the phosphors, the substitution ratios of Eu and Mn mainly emitting light, and the substitution ratio of trivalent Eu for bivalent Eu are varied as shown in Table 1. In the samples No. 5 and No. 6, the surfaces of the phosphor particles are coated with oxide or fluoride by the hydrolysis method. Phosphor ink containing the phosphor particles of each color shown in Table 1, resin, a solvent, and a dispersant is used for forming a phosphor layer. The viscosity of the phosphor ink of all colors is in a range of 1.5 to 30 Pa·s at 25° C. According to observation of all formed phosphor layers, wall surfaces of the barrier ribs can be uniformly coated with the phosphor ink without clogging. In each sample, the phosphor particles of the phosphor layer of each color have an average grain size of 0.1 to 3.0 µm and a maximum grain size of 8 µm or shorter. In sample No. 10, trivalent Eu is substituted for 60% of bivalent Eu in $Me_{3(1-X)}MgSi_2O_8:Eu_X$. In sample No. 11, blue phosphor particles having non-oxidized $Me_3MgSi_2O_8:Eu$ are employed. These samples are comparative examples with the experience samples No. 1 to No. 9 of the present invention, sample No. 10 is called comparative sample No. 10, and sample No. 11 is called comparative sample No. 11.

Bivalent and trivalent Eu ions shown in Table 1 are measured by an X-ray absorption near edge structure (XANES) method.

The 11 samples are used as a model experiment indicating how luminance of each color varies in the phosphor sintering process (520° C., 20 min) of the back panel manufacturing process, and luminances of each color and a rate of luminance change are measured before and after the sintering. Powder is used before the sintering, and a film produced by application and sintering of paste is used. This is experiment 1.

The luminance change (degradation) rate of each phosphor before and after lamination of panels (sealing process 450° C., 20 min) in the panel manufacturing process is measured. This is experiment 2.

In measuring the luminances and the luminance degradation rate when the panel is lighted every color, a discharge sustain pulse having 200 V of voltage and 100 kHz of frequency is continuously applied to the plasma display device for 100 hours, panel luminances before and after the application are measured, and then the luminance degradation rate is determined. The luminance degradation rate is defined by Luminance degradation rate=100×(luminance after application−luminance before application)/(luminance before application).

An address miss during address discharge is evaluated by visually observing flicking of an image. When flicking is recognized even in one place on the image, existence of the flicking is determined. Luminance distribution of the entire surface of the panel is determined by measuring the luminance of white with a luminance meter. Existence of clogging of the nozzle is checked for by continuous coating for 200 hours through the nozzle having 80 µm of inner diameter. This is experiment 3.

Table 2 shows results of the luminance and the luminance degradation rate for each color in experiments 1 to 3. Table 2 also shows a measurement result of the luminance when blue color is lighted on the entire surface

TABLE 2

| Sample No. | (Experiment 1) Luminance degradation rate by sintering phosphor at 520° C. in back panel manufacturing process | | | (Experiment 2) Luminance degradation rate of phosphor during sealing at 450° C. in panel laminating process | | | (Experiment 3) Change rate of pulse luminance in 100 hours after application of discharge sustain pulse of 200 V and 100 kHz | | | (Experiment 3) Presence or absence of address miss and nozzle clogging (in 200 hours) during address discharge | Luminance during lighting entire surface in blue color Cd/cm² |
|---|---|---|---|---|---|---|---|---|---|---|---|
| | Blue | Red | Green | Blue | Red | Green | Blue | Red | Green | | |
| 1 | 0.0 | −1.2 | −4.9 | 0.2 | −2.6 | −13.0 | −0.2 | −4.4 | −14.5 | both absence | 84.1 |
| 2 | 0.1 | −1.3 | −4.0 | 0.1 | −2.4 | −13.2 | −0.3 | −4.1 | −14.2 | both absence | 85 |
| 3 | 0.0 | −1.4 | −4.5 | 0.2 | −2.3 | −12.9 | −0.2 | −4.0 | −14.6 | both absence | 86.1 |

TABLE 2-continued

| Sample No. | (Experiment 1) Luminance degradation rate by sintering phosphor at 520° C. in back panel manufacturing process | | | (Experiment 2) Luminance degradation rate of phosphor during sealing at 450° C. in panel laminating process | | | (Experiment 3) Change rate of pulse luminance in 100 hours after application of discharge sustain pulse of 200 V and 100 kHz | | | (Experiment 3) Presence or absence of address miss and nozzle clogging (in 200 hours) during address discharge | Luminance during lighting entire surface in blue color Cd/cm² |
|---|---|---|---|---|---|---|---|---|---|---|---|
| | Blue | Red | Green | Blue | Red | Green | Blue | Red | Green | | |
| 4 | 0.1 | −1.4 | −4.7 | 0.1 | −2.2 | −12.7 | −0.2 | −4.2 | −14.1 | both absence | 83.5 |
| 5 | 0.1 | −1.5 | −4.9 | 0.0 | −2.0 | −12.9 | −0.1 | −4.3 | −14.8 | both absence | 85.8 |
| 6 | 0.1 | −1.2 | −4.3 | 0.1 | −2.3 | −12.6 | −0.1 | −4.1 | −14.9 | both absence | 91 |
| 7 | 0.2 | −1.4 | −4.5 | 0.2 | −2.4 | −12.3 | −0.2 | −4.2 | −14.7 | both absence | 88.9 |
| 8 | 0.1 | −1.2 | −4.3 | 0.3 | −2.5 | −12.5 | −0.2 | −4.3 | −15.1 | both absence | 90.1 |
| 9 | 0.2 | −1.5 | −4.1 | 0.2 | −2.1 | −12.8 | −0.2 | −4.1 | −15.6 | both absence | 84 |
| 10* | −0.3 | −1.3 | −4.2 | −0.2 | −2.3 | −13.0 | −0.3 | −4.1 | −14.8 | both absence | 58 |
| 11* | −0.4 | −1.5 | −4.1 | −1.2 | −2.4 | −13.2 | −11 | −4.4 | −15.6 | both presence | 82 |

*Samples No. 10 and No. 11 are comparative examples.

As shown in Table 2, in comparative sample No. 11 having no substitution of trivalent Eu for bivalent Eu in the blue phosphor, the luminance degradation rate in each process is high, and 11% of luminance degradation is found in the accelerated life test at 200 V and 100 kHz. An address miss and nozzle clogging occur.

As shown in Table 2, in comparative sample No. 10, the luminance degradation is in each process because trivalent Eu is substituted for 60% of bivalent Eu, but luminance of the panel extremely decreases.

In samples No. 1 to No. 9, all degradation rates of the blue phosphors are 0.5% or lower, and no address miss occurs. That is because substituting trivalent Eu ions for 5 to 55% of bivalent Eu ions in $Me_3MgSi_2O_8$:Eu of the blue phosphors extremely reduces oxygen defects in the blue phosphors. At this time, water and carbon hydride do not adsorb to defect layers on the surfaces of the phosphors, so that the address miss and clogging of the nozzle are eliminated without reducing the luminance of the panel. Here, the water and carbon hydride he in the atmosphere in sintering the phosphors, or come out of the MgO, barrier ribs, sealing frit materials, and the phosphors in sealing the panels.

Additionally, in experiment 4, the blue phosphors having no substitution of trivalent Eu ions for 5 to 55% of bivalent Eu ions and the phosphors in samples No. 1 to No. 9 are left for 10 minutes at 60° C. at 90% of relative humidity, then are dried at 100° C., and are then TDS (thermal desorption mass spectoscopy) analyzed. Resultant peaks of physical adsorption (about 100° C.) and chemical adsorption (300 to 500° C.) are about 15 times those in samples No. 1 to No. 9 where the substitution is performed. Therefore, the substitution of trivalent Eu for 5 to 55% of bivalent Eu can extremely reduce water adsorption. In experiment 5, the phosphors of the present invention are employed in a fluorescent light that is excited by ultraviolet rays to emit light.

Fluorescent light sample No. 12 is manufactured in which a phosphor layer produced by applying a mixture of phosphors of respective colors that are formed in the condition for sample No. 7 of Table 1 is disposed on the inner wall of a glass tube. For comparison, comparative fluorescent light sample No. 13 is similarly manufactured by applying a mixture of phosphors of respective colors that are formed in the condition for sample No. 11 of Table 1. Table 3 shows a comparison result.

TABLE 3

| Sample No. | Phosphor | Luminance (Cd/m²) | Luminance change after 5000 hours at 100 V and 60 Hz |
|---|---|---|---|
| 12 | Phosphor of sample No. 7 | 6850 | −0.31% |
| 13* | Phosphor of sample No. 11 | 6600 | −14.6% |

*Sample No. 13 is comparative example.

As shown in Table 3, the luminance and luminance degradation rate are extremely reduced in fluorescent light sample No. 12.

INDUSTRIAL APPLICABILITY

In a plasma display device of the present invention, trivalent Eu ions are substituted for 5 to 55% of bivalent Eu ions in a blue phosphor having of a blue phosphor layer composed of $Me_3MgSi_2O_8$:Eu. Thus, degradation of the phosphor layer in various processes can be prevented, the luminance and lifetime of a PDP or a fluorescent light can be increased, and the reliability can be improved.

What is claimed is:

1. A plasma display device comprising panel in which a plurality of discharge cells of one of one color or a plurality of colors are arranged, each of the discharge cells has a phosphor layer, and the phosphor layer are excited by an ultraviolet ray to emit light;

wherein
   the phosphor layer includes at least one blue phosphor layer,
   the blue phosphor layer has a blue phosphor containing a compound represented by $Me_3MgSi_2O_8$:Eu (where, Me is at least one of calcium (Ca), strontium (Sr), and barium (Ba)),
   of the europium (Eu) atoms contained in the blue phosphor layer, concentration of bivalent Eu ions is 45 to 95% and concentration of trivalent Eu ions is 5 to 55%.

2. A plasma display device according to claim 1, wherein when the compound $Me_3MgSi_2O_8$:Eu is represented as $Me_{3(1-X)}MgSi_2O_8$:$Eu_X$ (where, Me is at least one of Ca, Sr, and Ba), X is 0.03 to 0.25.

3. A phosphor having a crystal structure of a compound $Me_3MgSi_2O_8$:Eu (where, Me is at least one of Ca, Sr, and Ba), the compound being excited by an ultraviolet ray to emit visible light,
wherein of the Eu atoms contained in the phosphor layer, concentration of bivalent Eu ions is 45 to 95% and concentration of trivalent Eu ions is 5 to 95%.

4. A phosphor according to claim 3, wherein
when the compound $Me_3MgSi_2O_8$:Eu of the phosphor is represented as $Me_{3(1-X)}MgSi_2O_8$:$Eu_X$ (where, Me is at least one of Ca, Sr, and Ba), X is 0.03 to 0.25.

5. A phosphor manufacturing method comprising steps of:
sintering a phosphor containing a compound $Me_3MgSi_2O_8$:Eu (where, Me is at least one of Ca, Sr, and Ba) in oxidizing atmosphere, the compound including bivalent Eu ions in a matrix, so as to substitute trivalent Eu ions for 5 to 55% of bivalent Eu ions.

6. A phosphor manufacturing method comprising the steps of:
mixing phosphor powder with alkoxide or acetylacetone containing one of aluminum (Al), lanthanum (La), and silicon (Si) in alcohol solution, and hydrolyzing a resultant mixture, the phosphor powder being composed of $Me_3MgSi_2O_8$:Eu ( where, Me is at least one of Ca, Sr, and Ba) including bivalent Eu ions in a matrix;
removing an alcohol component from the mixture; and then
sintering the mixture in oxidizing atmosphere to substrate trivalent Eu ions for 5 to 55% of bivalent Eu ions and to form one of oxide and fluoride film of one Al, La, and Si on a surface of the phosphor powder.

7. A phosphor manufacturing method according to claim 5, wherein
in the step of sintering the phosphor containing the compound $Me_3MgSi_2O_8$:Eu (where, Me is at least one of Ca, Sr, and Ba) including bivalent Eu ions in the oxidizing atmosphere, the oxidizing atmosphere including one of oxygen, oxygen-nitrogen, ozone-nitrogen, and water vapor-nitrogen, and sintering temperature is 350 to 900 °C.

8. A phosphor manufacturing method comprising steps of:
producing a mixture by mixing one of oxide, carbonated material, and metallic salt that contains Ca, Ba, Sr, Mg, Si, and Eu;
decomposing one of the carbonated material and metallic salt by sintering the mixture in the air;
sintering the mixture in reducing atmosphere to provide a state where Eu atoms are bivalent; and
sintering the mixture in oxidizing atmosphere to provide a state where concentration of bivalent Eu ions is 45 to 95% and concentration of trivalent Eu ions is 5 to 55%.

* * * * *

UNITED STATES PATENT AND TRADEMARK OFFICE
CERTIFICATE OF CORRECTION

PATENT NO. : 7,161,298 B2
APPLICATION NO. : 10/489326
DATED : January 9, 2007
INVENTOR(S) : Hiroyuki Kawamura et al.

It is certified that error appears in the above-identified patent and that said Letters Patent is hereby corrected as shown below:

<u>Claim 1</u>

In column 18, line 1, please change "comprising panel" to --comprising a plasma display panel--.

In column 18, line 4, please change "phosphor layer" to --phosphor layers-- ($2^{nd}$ occur).

In column 18, line 5, please change "emit light;" to --emit light,--.

In column 18, line 7, please change "phosphor layer includes" to --phosphor layers include--.

<u>Claim 3</u>

In column 19, line 7, please change "5 to 95%." to --5 to 55%.--

<u>Claim 6</u>

In column 20, line 12, please change "to substrate" to --to substitute--.

In column 20, line 14, please change "of oxide and fluoride film of one Al," to --of oxide film and fluoride film of one of Al,--

Signed and Sealed this

Twenty-second Day of May, 2007

JON W. DUDAS
*Director of the United States Patent and Trademark Office*